US 6,456,403 B1

United States Patent
Archer et al.

(10) Patent No.: US 6,456,403 B1
(45) Date of Patent: Sep. 24, 2002

(54) IMAGE CAPTURE DEVICE HAVING A SCANNING MODE SWITCHING CAPABILITY

(75) Inventors: Stephen W. Archer, Bloomfield; Fernando J. Garcia, Rochester; Bruce A. Link, Rochester; Daniel Oldfather, Rochester; Mark A. Barton, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/272,105

(22) Filed: Mar. 19, 1999

(51) Int. Cl.$^7$ ................................................. H04N 1/04
(52) U.S. Cl. ...................................... 358/474; 358/468
(58) Field of Search ................................. 358/468, 474, 358/498, 462, 450, 486, 487, 475, 453, 505, 506, 509, 496, 497, 452, 504, 406; 382/317

(56) References Cited

U.S. PATENT DOCUMENTS

| | | | |
|---|---|---|---|
| 5,039,847 A | 8/1991 | Morii et al. ................. 235/379 |
| 5,155,538 A | 10/1992 | Monfalcone ................. 399/364 |
| 5,321,531 A | * 6/1994 | Hasebe et al. ............... 358/505 |
| 5,420,938 A | 5/1995 | Funada et al. ............... 382/173 |
| 5,511,150 A | 4/1996 | Beaudet et al. ............. 358/1.14 |
| 5,724,440 A | 3/1998 | Funada et al. ............... 382/162 |
| 5,748,774 A | 5/1998 | Murata ........................ 382/181 |
| 5,881,214 A | * 3/1999 | Morisawa et al. .......... 358/1.18 |
| 5,940,188 A | * 8/1999 | Kurozasa ..................... 358/436 |

* cited by examiner

Primary Examiner—Cheukfan Lee
(74) Attorney, Agent, or Firm—David A. Novais; Nelson Adrian Blish

(57) ABSTRACT

A system and method in which an image capture device such as a scanner can be automatically switched between a plurality of scanning modes without the need for manual intervention. In the system and method of the present invention, a document scanner can automatically switch or toggle between scanning modes while documents are being scanned. In one implementation of the present invention, the scanner can automatically switch between monochrome scanning and color scanning and vice versa based on a defined pattern on a document to be scanned. The document to be scanned can be in the form of a scanning mode switching document inserted into or associated with a stack of sheets of a jobstream. The scanning mode switching document can include a switching pattern that is detected by a processing system of the scanner. With the system and method of the present invention, it is possible to scan separate batches of documents in different scanning modes while automatically switching or toggling between the separate modes. This increases productivity and reduces the probability of operator error.

18 Claims, 3 Drawing Sheets

IMAGE CAPTURE DEVICE HAVING A SCANNING MODE SWITCHING CAPABILITY

CROSS REFERENCE TO RELATED APPLICATIONS

The present application is related to co-pending U.S. patent application Ser. No. 09/052,552 by William Greene, Randall Maysick, George Posser, Stephen Archer, and Joseph Olesik, entitled OPTICALLY SWITCHED BIMODAL SCANNER.

FIELD OF THE INVENTION

The present invention relates generally to an image capture device such as a scanner, and in particular to document scanners which can automatically switch and/or toggle between different scanning modes.

BACKGROUND OF THE INVENTION

Digital scanners can be used for a variety of applications, one of which is document scanning to convert text and images on paper documents into digital information. A scanner such as a document scanner typically works by illuminating the document and recording the resulting image using a camera, which typically includes a charged coupled device (CCD) as the image sensor.

It is often necessary to scan a variety of documents, some of which contain significant color information and some of which contain primarily text in typically black or blue ink. In large operations, it is possible that a user may have to scan a first series of documents in a color scanning mode having specific color scanning characteristics and a next series of documents in a monochrome scanning mode having specific monochrome scanning characteristics.

The above-noted co-pending application Ser. No. 08/052, 552 discloses a scanner which uses both fixed and movable mirrors to provide a common optical path to capture monochrome images and color images. However, existing scanners do not provide for a method and means by which a document scanner can automatically change or toggle between scanning modes on the fly while documents are being scanned.

Also, existing document scanners with monochrome (black and white) and color capabilities (ability to output color images) require that the scanner be stopped and then switched between modes by a command issued by a host computer which is initiated by an operator. This causes a decrease in scanning productivity because this mode switching method takes time during which scanning of documents is not occurring. One common strategy for minimizing this scanning productivity decrease is to batch documents depending on whether they are to be scanned in color or in black and white. However, it can still take a significant period of time to execute the mode switch.

It is known that pattern recognition on documents can be utilized to control scanning modes in microfilm scanning. However, in implementations such as microfilm scanning, the control relates to (1) the change of the scanning mode in one direction in which one pattern controls one change; and (2) the control of the document level or hierarchical file structure, as opposed to a bi-directional control of, for example, color and monochrome scanning.

SUMMARY OF THE INVENTION

The present invention provides for a unique method and apparatus for changing or toggling a scanning mode on the fly while documents are being scanned. The method and apparatus of the present invention utilizes pattern recognition to identify the type of scanning (scanning mode) to be performed. In pattern recognition, a unique pattern which is recognized by the scanner's image processing subsystem is placed on or included in a document to be scanned. Upon recognition of the pattern, the document scanner automatically changes or toggles between scanning modes. For example, based on the recognized pattern, the document scanner can switch or toggle between a monochrome scanning mode and a color scanning mode.

With the scanning method and apparatus of the present invention, documents which are to be scanned in different modes do not have to be batched, so that the documents which are to be scanned in one mode are not necessarily batched together and separated from the documents which are to be scanned in a different mode. Additionally, if batched document scanning is desired, separate batches of documents to be scanned in different modes can be effectively labeled as such in a form recognizable by the scanner. Thus the probability of operator error can be significantly reduced. Further, the method and apparatus of the present invention provides for the use of existing image capture and processing systems which obviates the need for additional hardware, and therefore minimizes system cost.

The present invention relates to an image capture device comprising an image processing system which processes data supplied thereto to determine if the data includes a scanning mode switching pattern, with the image processing system providing a scanning mode switching signal upon a detection of the scanning mode switching pattern; and a control system which receives the scanning mode switching signal and toggles a scanning mode of the image capture device between at least a first scanning mode and a second scanning mode when the scanning mode switching pattern is detected.

The present invention also relates to a scanning method which comprises the steps of processing data inputted to a scanner to detect a scanning mode switching pattern; and toggling a scanning mode of the scanner between at least a first scanning mode and a second scanning mode when the scanning mode switching pattern is detected.

The present invention also relates to an image capture device that comprises an image processing system which processes data supplied thereto to determine if the data includes a scanning mode switching pattern. The image processing system provides a scanning mode switching signal upon a detection of the scanning mode switching pattern. The scanning mode switching pattern comprises information on the type of scanning to be performed on an image to be scanned. The image capture device further comprises a control system that receives the scanning mode switching signal and switches a scanning mode of the image capture device based on the information on the scanning mode switching pattern.

The present invention further relates to a scanning method that comprises the steps of processing data inputted into a scanner to detect a scanning mode switching pattern, and recognize information on the scanning mode switching pattern indicative of the type of scanning to be performed on an image to be scanned; and switching a scanning mode of the scanner when the scanning mode switching pattern is detected. The scanning mode of the scanner is switched in accordance with the information on the scanning mode switching pattern indicative of the type of scanning to be performed on the image to be scanned.

The present invention further relates to a scanning mode switching device for an image capture assembly. The scanning mode switching device comprises an image processing system which processes data supplied thereto to determine if the data includes scanning mode switching information, and provides a switching signal upon a detection of the scanning mode switching information; and a control system which receives the switching signal and switches a scanning mode of the image capture device based on the scanning mode switching information.

DETAILED DESCRIPTION OF THE INVENTION

Figure 1:
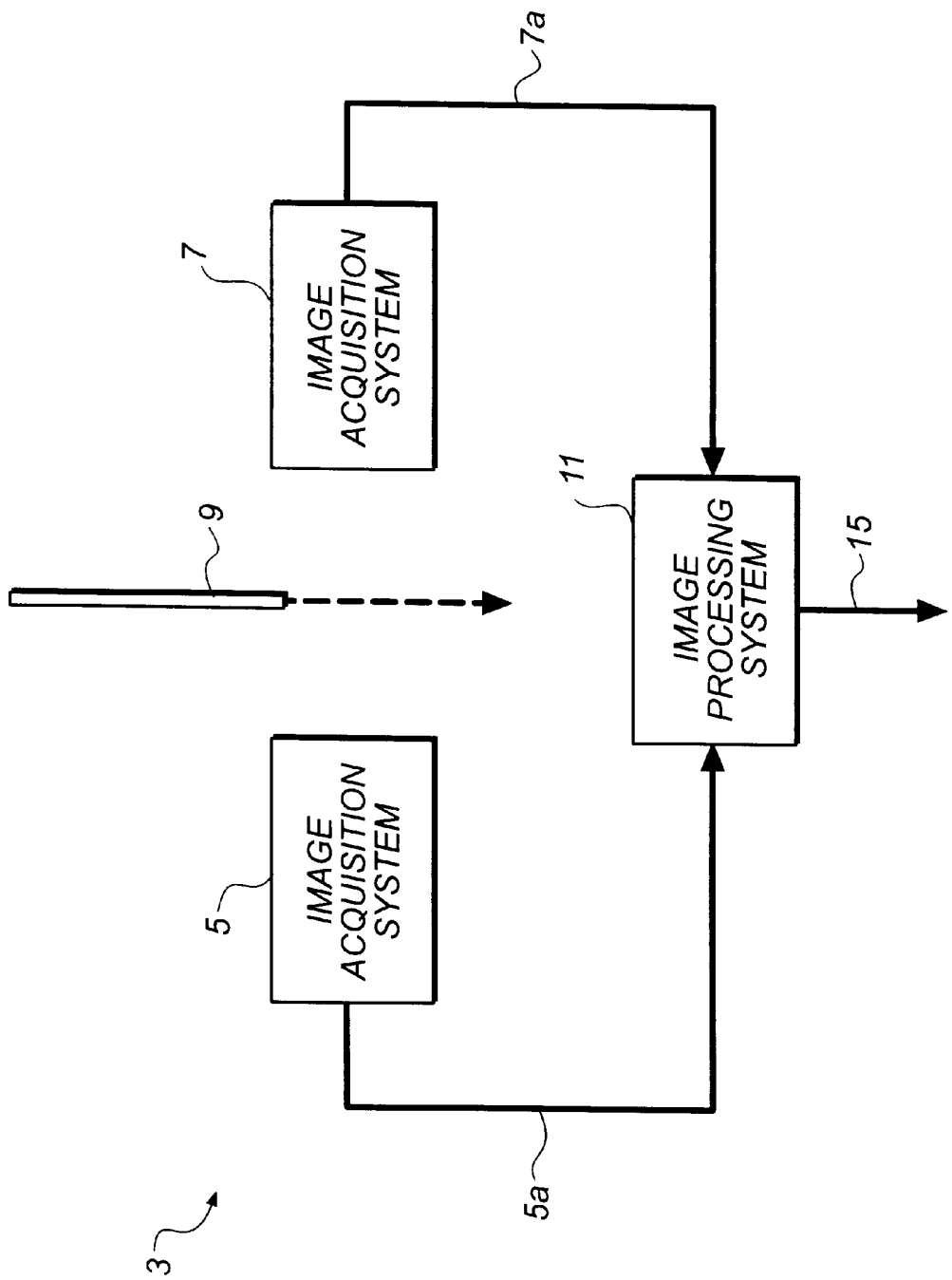
FIG. 1 is a schematic illustration of an image capture device such as a scanner which is capable of, for example, color scanning and monochrome scanning in accordance with the present invention.

Referring now to the drawings, wherein like reference numerals represent identical or corresponding parts throughout the several views, FIG. 1 schematically illustrates an image capture device such as a scanner 3 which can perform color scanning and monochrome scanning on an image or document to be scanned.

As illustrated in FIG. 1, scanner 3 can include an image acquisition system 5 which can be a color scanning subsystem that includes a color CCD; and an image acquisition system 7 which can be a monochrome scanning subsystem that includes a monochrome CCD. Scanner 3 as well as image acquisition systems 5 and 7 as illustrated in FIG. 1 can take the form of the scanner illustrated in the above-noted co-pending application U.S. Ser. No. 08/052,552. Although two image acquisition systems 5 and 7 are illustrated, the present invention is not limited thereto. It is recognized that based on design considerations, more than two image acquisition systems can be used, with each image acquisition system pertaining to different scanning characteristics such as speed, resolution, color, monochrome, ect.

As illustrated in FIG. 1, a document to be scanned 9 can be conveyed between image acquisition systems 5 and 7. Images can be selectively acquired via acquisition systems 5 and 7 and conveyed to a processing system 11 via lines 5a and 7a. That is, with the system as illustrated in FIG. 1, document 9 is scanned to convert text and images on the document into digital information which is passed to image processing system 11 through lines 5a and 7a. The information is thereby processed in image processing system 11 and converted into an image output 15 in a known manner.

In many instances, it is desired to scan a plurality of documents in a jobstream in which one type of scanning such as color scanning is to be performed on certain documents, and another type of scanning such as monochrome scanning is to be performed on other documents. In order to expedite this procedure, it is desirable but not necessary that the documents which are to be subjected to, for example, color scanning be batched together, and that the documents which are to be subjected to, for example, monochrome scanning be batched together. The present invention provides for the automatic switching or toggling of scanner 3 between at least a first scanning mode such as a color scanning mode, and a second scanning mode such as a monochrome scanning during the scanning process itself.

In one embodiment of the present invention, a user can dynamically switch or toggle between one scanning mode and another scanning mode by inserting a scanning mode switching/toggle document which includes a scanning mode switching/toggle pattern in predetermined locations in the jobstream. For example, a user can dynamically switch or toggle between a monochrome scanning mode and a color scanning mode by inserting a scanning mode switching/toggle document which includes a scanning mode switching/toggle pattern in predetermined locations in the jobstream. It is noted that the present invention is not limited to switching and/or toggling between color and monochrome and that the present invention can also switch and/or toggle between different scanning mode characteristics such as speed, resolution, compression algorithms, etc.

Figure 2:
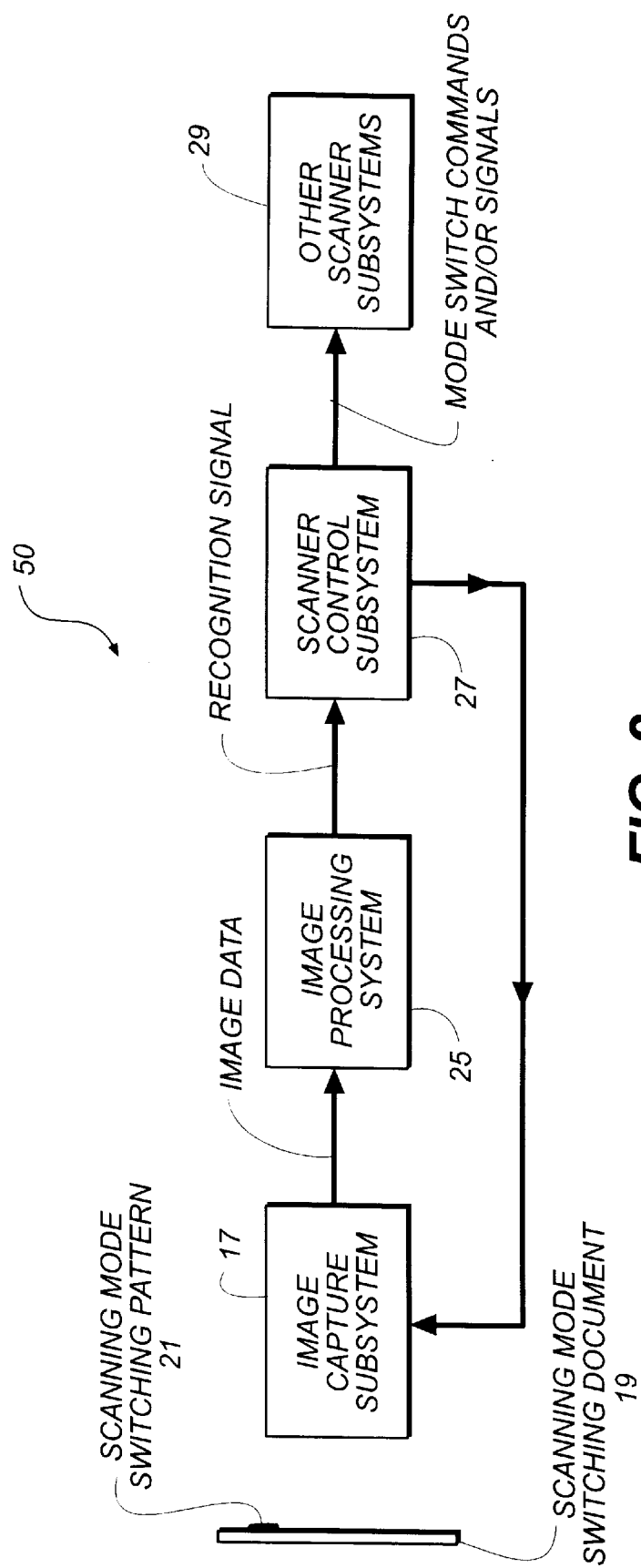
FIG. 2 is a schematic illustration of the scanner of FIG. 1 including the specific scanning mode switching implementation in accordance with the present invention.

Reference is now made to FIG. 2 which schematically illustrates an embodiment of an image capture device such as a scanner 50 in accordance with the present invention. The embodiment of FIG. 2 will be described with reference to switching/toggling between color and monochrome scanning modes as an example. However, as discussed above, the present invention is not limited thereto and can switch/toggle between numerous scanning modes based on design considerations. As illustrated in FIG. 2, image acquisition systems 5 and 7 which can include both color cameras and monochrome cameras are represented by image capture subsystem 17. During use of scanner 50, a user conveys an instructional document in the form of a scanning mode switching document 19 which includes a scanning mode switching pattern 21 thereon pass image capture subsystem 17. The instructional document is associated with a batch of documents to be scanned. Scanning mode switching pattern 21 includes information on whether, for example, color or monochrome scanning is to be performed on the batch of documents that follow document 19 having scanning mode switching pattern 21 thereon. More specifically, image capture subsystem 17 will acquire digital data representing scanning mode switching pattern 21 and pass this data to an image processing system 25. Image processing system 25 processes and decodes the data to determine if a switching pattern is present and recognize instructions which are to be performed in response to the switching pattern. Upon pattern recognition, a recognition signal is generated to a scanner control subsystem 27 such as a central processing unit (CPU). Upon receipt of the recognition signal, scanner control subsystem 27 controls image capture subsystem 17 as well as other scanner subsystems 29 to execute a mode switch or toggle operation in accordance with the instructions on scanning mode switching pattern 21. When the mode switch is complete, scanner control subsystem 27 resumes scanning. All of the above can be done without any operator intervention.

Therefore, with the embodiment of the present invention as described above, a first batch of documents can follow a document 19 with a scanning mode switching pattern 21 thereon which instructs the scanner to perform color scanning on the first batch. As document 19 passes image capture subsystem 17, data from scanning mode switching pattern 21 is passed to image processing system 25 which detects switching pattern 21 and recognizes the instruction to perform color scanning on the first batch of documents which follow document 19. That is, a recognition signal will be given to scanner control subsystem 27 which will provide a mode switching signal to image capture subsystem 17 and scanner subsystem 29 to perform a color scanning on documents in the first batch which follow document 19. After color scanning is performed, a second batch of documents can follow a second document 19 with a switching pattern 21 thereon that instructs the scanner to perform monochrome scanning. Once image capture subsystem 17 conveys the data to image processing system 25, image processing system 25 detects and recognizes the instructions from switching pattern 21 to perform monochrome scanning. Image processing system 25 and scanner control system 27 then provide instructions to image capture subsystem 17 and scanner subsystem 29 to perform monochrome scanning.

In a preferred embodiment of the system and method of the present invention, scanner 50 can dynamically toggle between first and second scanning modes using one switching pattern 21. That is, an instructional document with a switching pattern 21 can be positioned at predetermined positions in a jobstream, and every time the image capture subsystem 17 and image processing system 25 recognizes the presence of switching pattern 21, the scanner automatically toggles from the scanning mode in which it is presently in (for example, the first scanning mode) to the second scanning mode. When image capture subsystem 17 and image processing system 25 recognizes the next instructional document 19 and switching pattern 21 in the jobstream, the scanner will toggle back to the first scanning mode. In this embodiment, the scanner automatically toggles back and forth between scanning modes every time a switching pattern 21 is detected.

In a further feature, it is noted that the present invention is not limited to toggling between first and second scanning modes. For example, the system of the present invention can be adapted to provide for multiple scanner parameters to which the scanner can be changed. Thus, with the system of the present invention, it is possible for the scanner to first change from color to black and white, and thereafter change speed, resolution, compression algorithms, etc., based on the information on the detected switching pattern 21.

Therefore, with the system and method of the present invention, a user can automatically switch and/or toggle back and forth between, for example, a monochrome scanning mode and a color scanning mode in a jobstream by inserting a document 19 with a switching pattern 21 thereon into specific locations of the jobstream. Image capture system 17 and image processing system 25 continuously monitors the inputted data for data representing an instruction to resort to a specific scanning mode. When image processing system 25 and scanner control subsystem 27 recognizes that there is to be a switch in the scanning mode, scanner control subsystem 27 can provide instructions to a document feeder to stop a feeding of documents and make the switch before the feeding of the documents that follows document 19.

Of course, it is recognized that as an alternative, switching pattern 21 can be placed directly on documents to be scanned as opposed to on an instructional document as described above. Additionally, as previously noted, it is recognized that the present invention can provide switching mode instructions for controlling other attributes of the scanner other than monochrome and color scanning. For example, switching pattern 21 could include scanner characteristics instructions with respect to resolution, compression, etc., and control the scanning mode accordingly.

With respect to scanning mode switching pattern 21, this could be in the form of a series of black lines similar to a patch or other discrete and known shapes in fixed patterns. For example, a first unique pattern can be used for color scanning, and a second unique pattern can be used for monochrome scanning. As a further example, a single pattern can be used to trigger a toggling between a variety of scanning modes.

Figure 3:
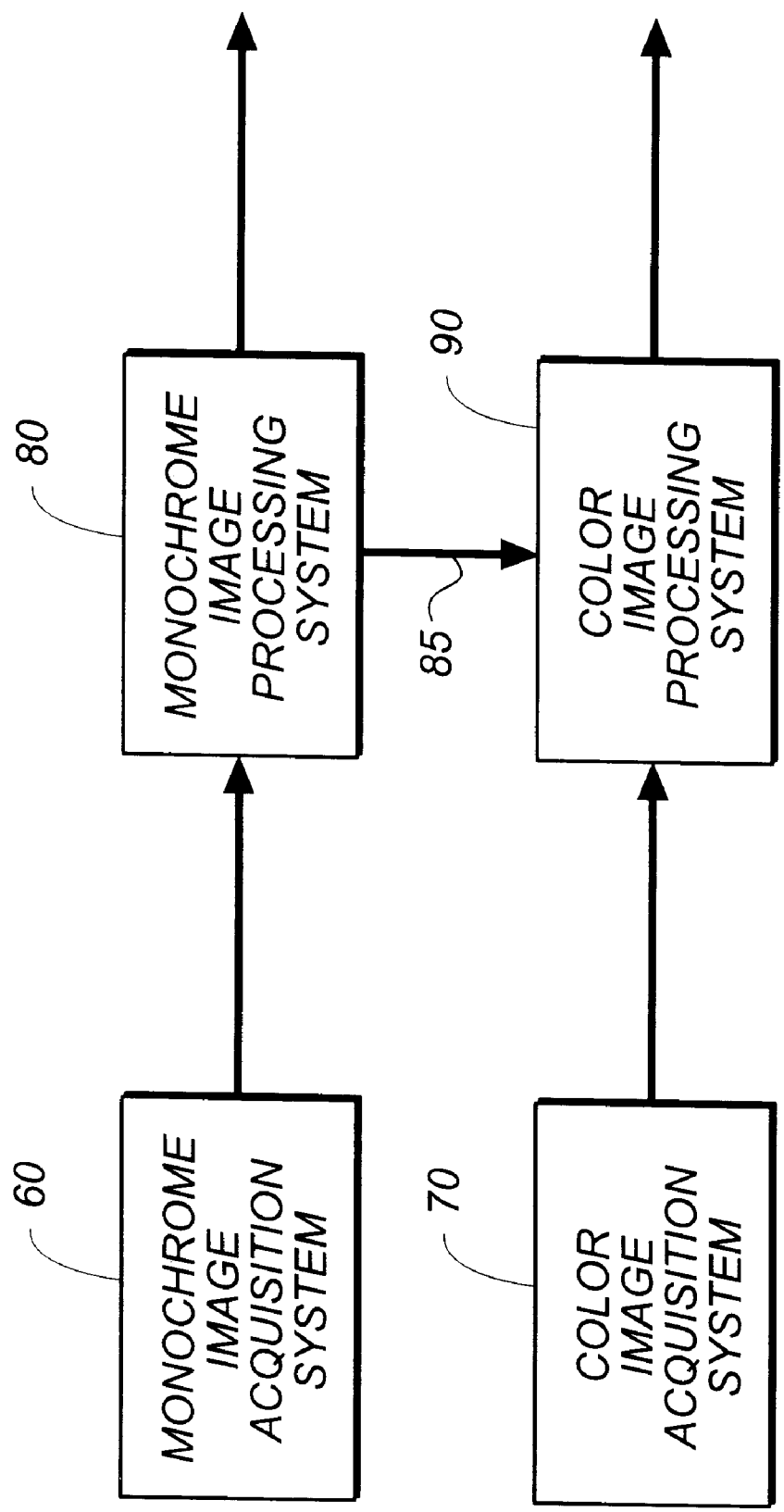
FIG. 3 is a schematic illustration of a further embodiment of the present invention.

FIG. 3 illustrates a further embodiment of the present invention. FIG. 3 shows a monochrome image acquisition system 60, which conveys the data it acquires to a monochrome image processing system 80, and a color image acquisition system 70, which conveys the data it acquires to a color image processing system 90. The combination of both image processing systems is equivalent to the image processing system 25 described in FIG. 2. In such an image processing system where color and monochrome processing is separate, it is desirable to include pattern detection circuitry in one location. This necessitates the addition of a path 85 between both image processing subsystems as shown in FIG. 3. This approach enables a net savings in hardware and additionally allows only one image acquisition system to be active at any given time to assure capture of the pattern to be detected. Otherwise, both acquisition systems would have to be enabled simultaneously.

With the method and system of the present invention, it is possible to automatically switch or toggle between scanning modes on the fly while documents are being scanned. This provides for an increase in scanner productivity especially when batches of documents in which, for example, color scanning and monochrome scanning is to be performed is fed to a scanner.

The invention has been described in detail with particular reference to certain preferred embodiments thereof, but it will be understood that variations and modifications can be effected within the spirit and scope of the invention.

What is claimed is:

1. An image capture device comprising:
    an image processing system which processes data supplied thereto to determine if the data includes a scanning mode switching pattern, said image processing system providing a scanning mode switching signal upon a detection of said scanning mode switching pattern;
    a control system which receives said scanning mode switching signal and toggles a scanning mode of said image capture device between at least a first scanning mode and a second scanning mode when the scanning mode switching pattern is detected; and
    wherein said first scanning mode and said second scanning mode relate to scanner characteristics with respect to at least color scanning, monochrome scanning, scanner speed, scanner resolution, and scanner compression algorithms.

2. An image capture device according to claim 1, wherein said scanning mode switching pattern is located on a document to be scanned.

3. An image capture device according to claim 1, wherein said scanning mode switching pattern is located on a scanning mode switching document which is associated with a stack of documents to be scanned.

4. A scanning method comprising the steps of:
    processing data inputted to a scanner to detect a scanning mode switching pattern;
    toggling a scanning mode of the scanner between at least a first scanning mode and a second scanning mode when the scanning mode switching pattern is detected; and wherein said first and scanning modes relate to scanner characteristics with respect to at least color scanning, monochrome scanning, scanner speed, scanner resolution, and scanner compression algorithms.

5. A method according to claim 4, wherein said scanning mode switching pattern is located on a document to be scanned.

6. A method according to claim 4, wherein said scanning mode switching pattern is located on a scanning mode switching document which is associated with a stack of documents to be scanned.

7. An image capture device comprising:

an image processing system which processes data supplied thereto to determine if the data includes a scanning mode switching pattern, said image processing system providing a mode switching signal upon a detection of the scanning mode switching pattern, said scanning mode switching pattern comprising information on the type of scanning to be performed on an image to be scanned;

a control system which receives said scanning mode switching signal and switches a scanning mode of said image capture device based on the information on the scanning mode switching pattern; and wherein said scanning mode switching pattern comprises color scanning mode information or monochrome scanning mode information, such that said control system switches said image capture device to a color scanning mode upon a detection of the color scanning mode information, and switches said image capture device to a monochrome scanning mode upon a detection of the monochrome scanning mode information.

8. An image capture device according to claim 7, wherein said scanning mode switching pattern comprises at least one of scanner speed information, scanner resolution information and scanner compression algorithm information.

9. An image capture device according to claim 7, wherein said scanning mode switching pattern is located on a document to be scanned.

10. An image capture device according to claim 7, wherein said scanning mode switching pattern is located on a scanning mode switching document inserted into a stack of documents to be scanned, said scanning mode switching document providing information to said image processing system regarding the type of scanning to be performed on documents which follow said scanning mode switching document in said stack of documents.

11. A scanning method comprising the steps of:

processing data inputted to a scanner to detect a scanning mode switching pattern and recognize information on said scanning mode switching pattern indicative of the type of scanning to be performed on an image to be scanned;

switching a scanning mode of the scanner when the scanning mode switching pattern is detected, said scanning mode of the scanner being switched in accordance with the information on the scanning mode switching pattern indicative of the type of scanning to be performed on the image to be scanned; and wherein said information on said scanning mode switching pattern includes instructions to perform a color scanning on the image to be scanned or instructions to perform a monochrome scanning on the image to be scanned.

12. A scanning method according to claim 11, wherein said scanner automatically switches between a color scanning mode when color scanning instructions are detected and a monochrome scanning mode when monochrome scanning instructions are detected.

13. A scanning method according to claim 11, wherein said scanning mode switching pattern comprises at least one of scanner speed information, scanner resolution information and scanner compression algorithm information.

14. A scanning method according to claim 11, wherein said processing step comprises detecting the scanning mode switching pattern on a document to be scanned.

15. A scanning method according to claim 11, wherein:

said processing step comprises the step of inserting a scanning mode switching document having said scanning mode switching pattern thereon into predetermined locations in a stack of documents to be scanned, such that said scanning mode switching document includes information regarding the type of scanning which is to be performed on documents in said stack which follow the scanning mode switching document; and said switching step comprises the step of switching said scanning mode of said scanner in accordance with the information on said scanning mode switching document.

16. A scanning mode switching device for an image capture assembly, the scanning mode switching device comprising:

an image processing system which processes data supplied thereto to determine if the data includes scanning mode switching information, and provides a switching signal upon a detection of the scanning mode switching information;

a control system which receives said switching signal and switches a scanning mode of the image capture device based on the scanning mode switching information; and wherein said control system switches the image capture device between a color scanning mode and a monochrome scanning mode upon a detection of the scanning mode switching information.

17. A scanning mode switching device according to claim 16, wherein said scanning mode switching information is located on a document to be scanned.

18. A scanning mode switching device according to claim 16, wherein said scanning mode switching information is located on a scanning mode switching document which is associated with a stack of documents to be scanned.

* * * * *